United States Patent [19]

Jondelius

[11] Patent Number: 5,106,051
[45] Date of Patent: Apr. 21, 1992

[54] BOX FOR SUPPORTING A PRINTER

[76] Inventor: Björn Jondelius, Upplandsgatan 84, S-113 44 Stockholm, Sweden

[21] Appl. No.: 483,896

[22] Filed: Feb. 23, 1990

[30] Foreign Application Priority Data

Feb. 27, 1989 [SE] Sweden ............................... 8900680

[51] Int. Cl.$^5$ ............................................. F16M 1/00
[52] U.S. Cl. ................................... 248/676; 400/691; 400/624; 271/171; 271/223; 403/381
[58] Field of Search ............ 248/676, 149, 429, 442.2; 400/691, 693, 694, 624, 625, 630, 633; 271/171, 223; 403/381

[56] References Cited

U.S. PATENT DOCUMENTS

| | | | |
|---|---|---|---|
| 1,468,786 | 9/1923 | Knechtel | 403/381 |
| 2,801,895 | 8/1957 | Gass | 403/381 X |
| 4,173,287 | 11/1978 | Kumakawa | 403/381 X |
| 4,343,461 | 8/1982 | Tomimori et al. | 271/171 X |
| 4,575,067 | 3/1986 | Ciatteo | 271/171 X |
| 4,781,480 | 11/1988 | Kikuchi et al. | 400/691 |

Primary Examiner—Carl D. Friedman
Assistant Examiner—Korie H. Chan
Attorney, Agent, or Firm—Nies, Kurz, Bergert & Tamburro

[57] ABSTRACT

A box for supporting a printer intended for connection to a computer, the box being intended to be placed on a table in a workroom. The box includes two side wall pieces, a bottom-piece and a top-piece, which pieces can be fitted together to form a parallelepipedic box; the box further includes two side-supports which cooperate displaceably with a groove or channel provided in the bottom-piece, this groove or channel extending perpendicularly to the side-walls; the side-supports have a height which is equal to the internal height of the box between bottom and top and which side-supports are provided with support-parts which project outwardly at right angles from the side-supports and which fit in and slide in the groove or channel. The box can be used for bottom-feeding and rear-feeding or printing paper to the printer, and the box is configured to enable similar boxes to be stacked on one-another.

5 Claims, 1 Drawing Sheet

BOX FOR SUPPORTING A PRINTER

BACKGROUND OF THE INVENTION

The present invention relates to a box for supporting printers, and particularly but not exclusively for supporting tractor-feed printers intended for use with personal computers.

A large number of the printers available on the market are small and intended for use with personal computers. These printers are intended to be placed in the rooms in which a personal computer is found.

Nearly all printers of this category come without a stand, or special-duty table, or like furniture.

Consequently, in the majority of cases it has been normal practice to place the printer on a side-table, a desk or the like. Such printers also often use tractor-feed paper. Furthermore, it is usual that one and the same person is required to work with different types of paper, sets of forms, and the like. These papers are normally supplied in bundles of 250, 500, 1000, 2000 sheets or sets.

Since the printer is normally placed on a table, the paper bundles are normally placed on the floor, beneath and behind the printer.

Consequently, when a different type of paper needs to be used, the user is forced to creep or stoop down behind the table, in order to change the paper and to pass the paper up to the printer.

This task is both awkward and uncomfortable. Furthermore, the presence of bundles of paper on the floor impedes cleaning of the rooms concerned.

SUMMARY OF THE INVENTION

The present invention solves the above-noted problems.

Accordingly, the present invention relates to a box for supporting a printer intended for connection to a computer, and primarily intended to be placed on a table in a room. The invention is characterized in that the box comprises two side-walls, a bottom-piece and a top-piece, all of which can be fitted together to form a parallelepipedic box; in that the box further comprises two side-supports which coact displaceably with a groove or channel provided in the bottom-piece and extending perpendicularly to the side-walls; and in that the height or vertical extension of the side-supports is equal to the internal height of the box, said side-supports having support-parts which project at right angles to the side-supports and which slide in said groove.

BRIEF DESCRIPTION OF THE DRAWING

The invention will now be described in more detail with reference to exemplifying embodiments thereof illustrated in the accompanying drawing, in which

FIG. 2b illustrates the side-support shown in FIG. 2a as seen from the left in FIG. 2a;

DESCRIPTION OF THE PREFERRED EMBODIMENTS

Figure 1:
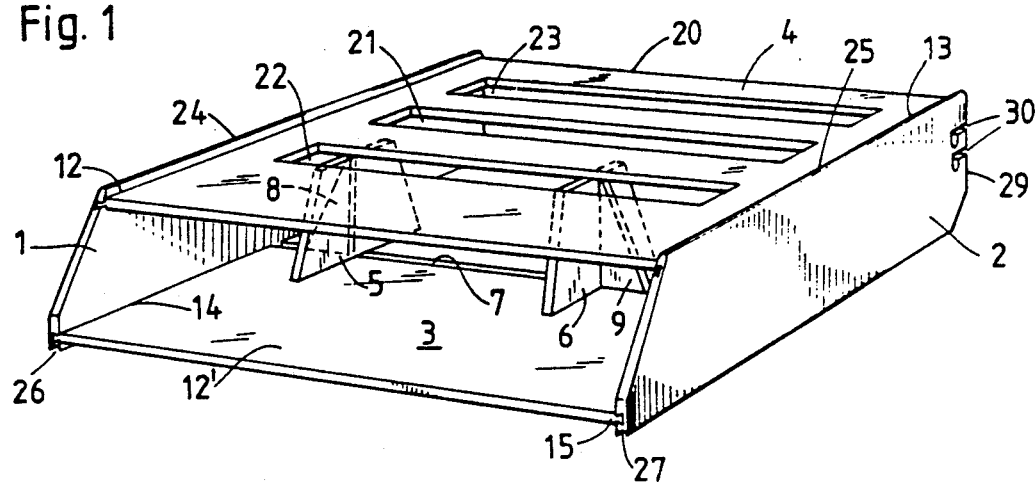
FIG. 1 illustrates the inventive box schematically and in perspective.

FIG. 1 is a schematic, perspective view of a box constructed in accordance with the invention. The box is meant primarily to support a printer intended for connection to a computer and intended to be placed on a table in a workroom. The box is intended for use with small printers used with personal computers, although the box can, of course, also be used with larger printers.

Figure 2A:
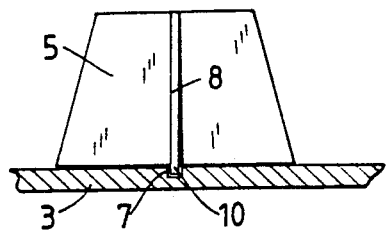
FIG. 2a illustrates a side-support shown to the right in FIG. 1, and is a view taken from the right of said Figure.
Figure 2B:
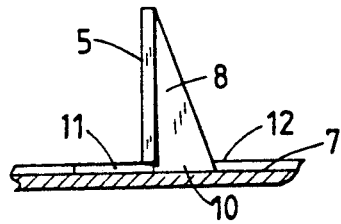

The box has two side-walls 1, 2, a bottom-piece 3 and a top-piece 4. These box members 1–4 can be assembled to form a parallelepipedic box. The box also includes two side-supports 5, 6 which are intended to cooperate with a groove 7 provided in the bottom-piece 3 so as to be movable along the groove, the groove 7 extending at right angles to the plane of the side-walls 1, 2. The side-supports 5, 6 have a height, or vertical extension, which is equal to the internal height of the box and have support-parts 8, 9 which project at right angles from the side-supports, as shown in FIGS. 1, 2a and 2b. The bottom part 10 of respective support-parts 8, 9 is intended to slide in the groove 7.

According to one preferred embodiment, each of the side-supports 5, 6 is planar and has a triangular-shaped support-part 8, 9.

The box is made preferably from a plastics material which is strong and which can be easily worked mechanically. One such material is ABS-plastic.

According to another preferred embodiment, each of the side-supports 5, 6 has a projection 11 located on opposite sides of its support-parts 8, 9, at the bottom edges thereof. The projection 11 is intended to slide in the groove 7 and the height of the projection is such that said projection will not protrude above the upper surface 12' of the bottom piece 3; see FIG. 2b.

Figure 4:
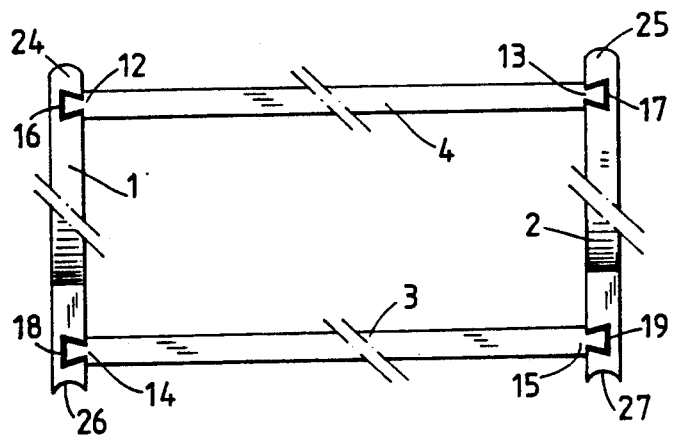
FIG. 4 illustrates the box of FIG. 1, seen immediately from the front.

The side-edges 12, 13; 14, 15 of the top-piece and bottom-piece of the box are configured to cooperate with corresponding grooves or channels 16, 17; 18, 19 provided in the side-walls 1, 2, so as to enable the members to be assembled into a box-like configuration. As illustrated in FIG. 4, the side-edges 12–15 of respective top and bottom pieces 3, 4 have a dovetail configuration and the grooves 16–19 in the side-walls 1.2 have a corresponding but complementary shaped groove configuration.

Thus, when assembling the box, the side-walls 1.2 for instance are pushed onto the bottom-piece 3 and the side-supports 5, 6 are then placed in the groove 7, whereafter the top piece 4 is pushed onto the side-walls 1, 2.

The box can thus be assembled quickly and simply.

In the case of the aforedescribed embodiment, the box is assembled with the aid of dovetail joints. It will be understood, however, that the grooves and projections may have any configuration suitable for joining together the four members 1–4 to form a box.

The fact that the box can be assembled in the aforedescribed manner affords a number of important advantages. For instance, the box can be readily stored and transported in the form of an assembly kit. Furthermore, side-walls and side-supports of mutually different heights and top and bottom-pieces of mutually different widths can be provided for later assembly.

Consequently, the box, in which some of the members have different sizes, can be adapted to printers of mutually different size and paper bundles of mutually different thicknesses.

For instance, the box may have a width of 400–800 mm, a depth, for instance, 300–500 mm, and a height, for instance, of 100–250 mm.

Because the height of the side-supports corresponds to the internal height of the box, and because the side-supports are provided with support-parts 8, 9, the side-supports coact with the top and bottom pieces of the box in a manner which prevents the box from being twisted to a rhomboidal shape, when seen immediately from the front. The box is thus very stable. The side-supports 5, 6 are intended to be pushed against a stack of printing paper (not shown) placed in the box, and thus support said paper stack.

The side-supports, however, also function to take-up vertically acting forces exerted by a printer placed on top of the box.

The box is intended to be placed on a table. When using the inventive box, the printing paper is placed in the box and the printer is placed on top of the box. In the case of printers with which the paper is fed-in from the rear, the paper is passed in the form of a paper web, from the interior of the box and upwards past the rear upper edge 20 of the box.

According to one preferred embodiment, the top-piece 4 of the box has provided therein at least one broad slot 21 which extends perpendicularly to the side-walls and over the greater part of the width of the box. This slot enables the paper to be passed from the paper bundle in the box up through the top-piece of said box, to a bottom fed printer. The embodiment illustrated in FIG. 1 has three slots 21–23. This box is thus adapted to suit different bottom-feed printers, since mutually different printers have the infeed opening located in mutually different positions.

Figure 5:
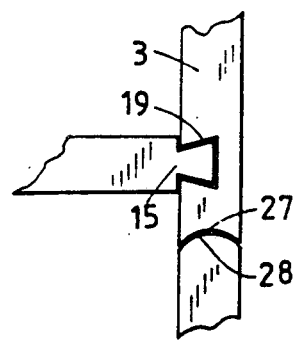
FIG. 5 is a detail view of the bottom right-hand corner of FIG. 1.

According to a further, preferred embodiment of the invention, the side-walls 1, 2 of the box are so configured that the upper edges 24, 25 and the lower edges 26, 27 of said side-walls will project upwardly and downwardly respectively from the top-piece 3 and the bottom-piece 4 of said box, whereas, when seen in cross-section, the edges 24–27 are configured with mutually complementary forms, such that two or more boxes can be stacked one upon the other. FIGS. 4 and 5 illustrate an embodiment in which the upper edges 24, 25 are upwardly convex and the bottom edges 26, 27 are upwardly concave and have a complementary form to the convex shape of the upper edges. FIG. 5 is an enlarged view of the bottom right hand corner of FIG. 4, with its lower edge 27 complemented with the upper edge 28 of an underlying, similar box.

This box configuration enables, for instance, two boxes to be stacked one upon the other, of which one box can contain paper of one kind and the other box paper of a different kind. This greatly facilitates the change-over from one type of paper to another compared with the normal practice of stooping or crouching down onto the floor to move to one side the paper with which the printer is loaded and then position another bundle of paper and guide this paper up into the printer. Certain printers are constructed so that one chain of paper can be loaded into the printer through a bottom-feed, whereas another paper chain can be loaded, at the same time from the rear. The inventive box is particularly suitable for printers of this kind, since bottom-feeding can be effected with paper from the top box while paper loaded into the rear of the printer is taken from the bottom box.

It will be understood that the edges 24–27 can be configured in some other way suitable for enabling the boxes to be stacked one upon the other.

According to another preferred embodiment, the rear, vertical edge-surface 29 of at least one side-wall 2 is provided with one or more substantially L-shaped slots 30, where each slot 30 has a section which extends substantially horizontally inwards from the edge of said side-wall and merges with a substantially vertical downwardly extending section.

Figure 3:
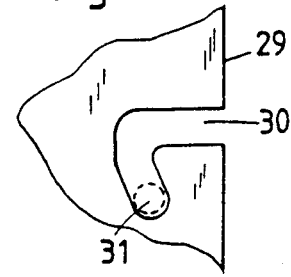
FIG. 3 is a sectional detail view of the rear part of a side-wall of the box.

The purpose of these slots is to enable cables connected to the printer to be hung-up in the box, with one cable being passed through each slot. FIG. 3 illustrates a slot 30 in larger scale, with a cable 31 shown in broken lines hooked onto the bottom of the slot. Normally, two cables are found, one for supplying current and one for connecting the printer to the computer.

It will be obvious to one of normal skill in this art that the configuration of the box and its various members can be varied considerably without departing from the fundamental concept of constructing the box in a manner which will enable the box to support a printer and the printing paper used thereby to be placed in the box.

The present invention is thus not restricted to the aforedescribed embodiments, since modifications can be made within the scope of the following claims and are intended to be embraced therein.

What is claimed and desired to be secured by Letters Patent is:

1. A box for supporting a printer intended for connection to a computer and placed on a table in a workroom, characterized in that the box includes two side-wall pieces (1,2), a bottom-piece (3) and a top-piece (4), which said pieces (1–4) can be fitted together to form a parallelepipedic box which includes a groove (7) in its bottom piece and two side-supports (5,6) which cooperate displaceably with said groove (7), said groove (7) extending perpendicularly to said side-walls (1,2); said side-supports (5,6) having a height dimension which is equal to the internal height dimension of the box between said bottom and top pieces and which said side-supports (5,6) are provided with support-parts (8,9) that project outwardly at right angles from the side-supports and which have portions that fit and slide in said groove (7); said box being further characterized in that the respective side-edges (12, 13; 14, 15) of the top-piece (3) and the bottom-piece (4) are configured to cooperate with corresponding complementary shaped grooves (16–19) in said side-wall pieces (1,2) to join and interlock the four box-pieces to a box form.

2. A box as defined in claim 1, wherein said side-edges (12–15) of the top-piece and the bottom-piece respectively have dovetail configuration and the said grooves (16–19) in the side-wall pieces have a corresponding shaped complementary dovetail groove configuration.

3. A box for supporting a printer intended for connection to a computer and placed on a table in a workroom, characterized in that the box includes two side-wall pieces (1,2), a bottom-piece (3) and a top-piece (4), which said pieces (1–4) can be fitted together to form a parallelepipedic box which includes a groove (7) in its bottom piece and two side-supports (5,6) which cooperate displaceably with said groove (7), said groove (7) extending perpendicularly to said side-walls (1,2); said side-supports (5,6) having a height dimension which is equal to the internal height dimension of the box between said bottom and top pieces and which side-supports (5,6) are provided with support-parts (8,9) that project outwardly at right angles from the side-supports and which have portions that fit and slide in said groove (7); said box being further characterized in that the rear, vertical edge portion (29) of at least one said side-wall piece (1,2) has provided therein at least one substantially L-shaped slot (30), said at least one slot (30) having a section which extends substantially horizontally in from the edge of said side-wall piece and merges with a substantially vertical, downwardly extending section.

4. A box for supporting a printer intended for connection to a computer and placed on a table in a workroom, characterized in that the box includes two side-wall pieces (1,2), a bottom-piece (3) and a top-piece (4) which said pieces (1–4) can be fitted together to form a parallelepipedic box which includes a groove (7) in its bottom piece and two side-supports (5,6) which cooperate displaceably with said groove (7), said groove (7) extending perpendicularly to said side-walls (1,2); said side-supports (5,6) having a height dimension which is equal to the internal height dimension of the box between said bottom and top pieces and which side-supports (5,6) are provided with support-parts (8,9) that project outwardly at right angles from said side-supports and which have portions that fit and slide in said groove (7); said box being further characterized in that each of the side-supports (5,6) is planar, and in that their associated said support-parts (8,9) are triangular in shape; and wherein each of said side-supports (5,6) having provided at its bottom edge and on opposite sides from said associated support-part (8,9), a projection (11) which fits in and is adapted to move in said groove (7) and the vertical dimension of said projection being no greater than the depth dimension of said groove so that said projection will not protrude above the upper surface (12') of said bottom-piece (3).

5. A box for supporting a printer intended for connection to a computer and placed on a table in a workroom, characterized in that the box includes two side-wall pieces (1,2), a bottom-piece (3) and a top-piece (4), which said pieces (1–4) can be fitted together to form a parallelepipedic box; said box further including a groove in said bottom piece and two side-supports (5,6) which cooperate displaceably with said groove (7), said groove (7) extending perpendicularly to said side-walls (1,2); said side-supports (5,6) having a height dimension which is equal to the internal height dimension of the box between said bottom and top pieces and which side-supports (5,6) are provided with support-parts (8,9) that project outwardly at right angles from the side-supports and which have portions that fit and slide in said groove (7); and wherein the top edges (24, 25) and bottom edges (26, 27) of the side-wall pieces (1, 2) project above and beneath the top-piece (3) and the bottom-piece (4) of the box respectively, said edges (24–27) having mutually complementing configurations, as seen in cross-section, such as to enable two or more boxes to be stacked one upon the other.

* * * * *